Oct. 9, 1928.
A. E. COOK
1,686,517
AUTO. MARINE VEHICLE
Filed Jan. 22, 1927    6 Sheets-Sheet 2
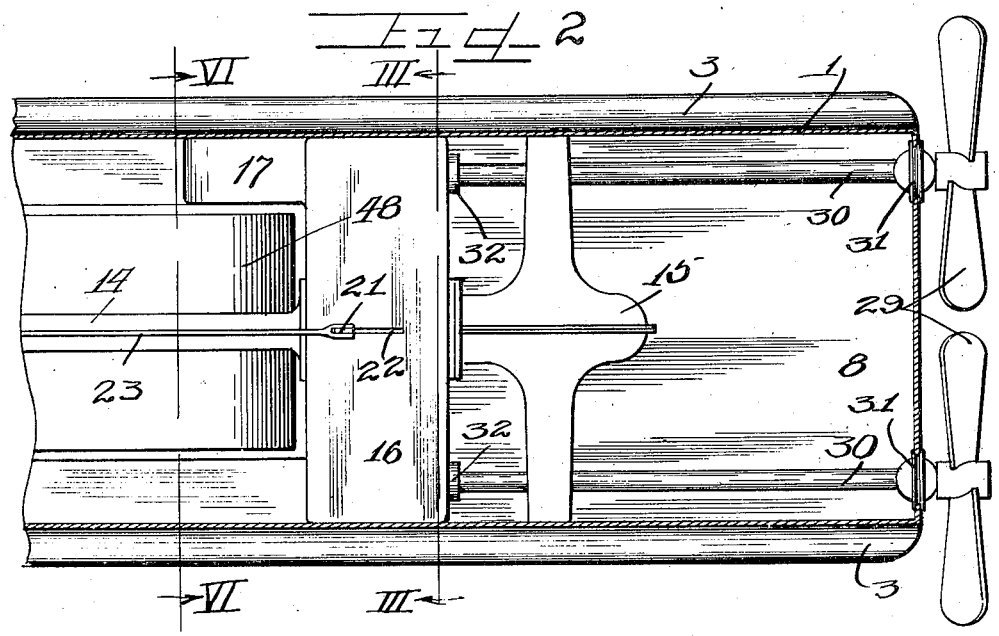
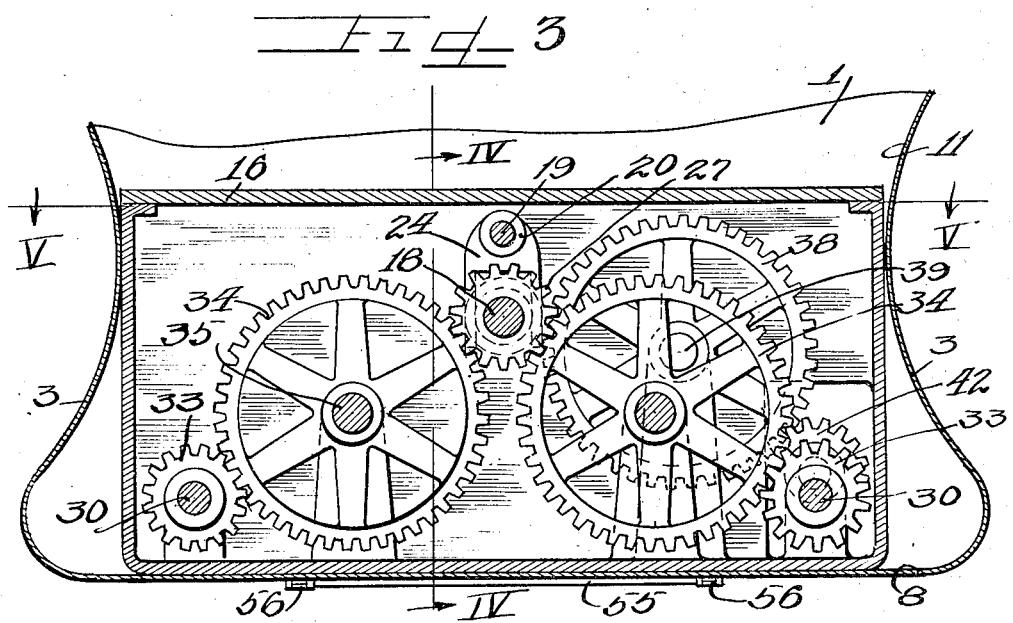
Inventor
Albert E. Cook
by Charles Hill
Attys Oct. 9, 1928.
A. E. COOK
1,686,517
AUTO MARINE VEHICLE
Filed Jan. 22, 1927
6 Sheets-Sheet 3
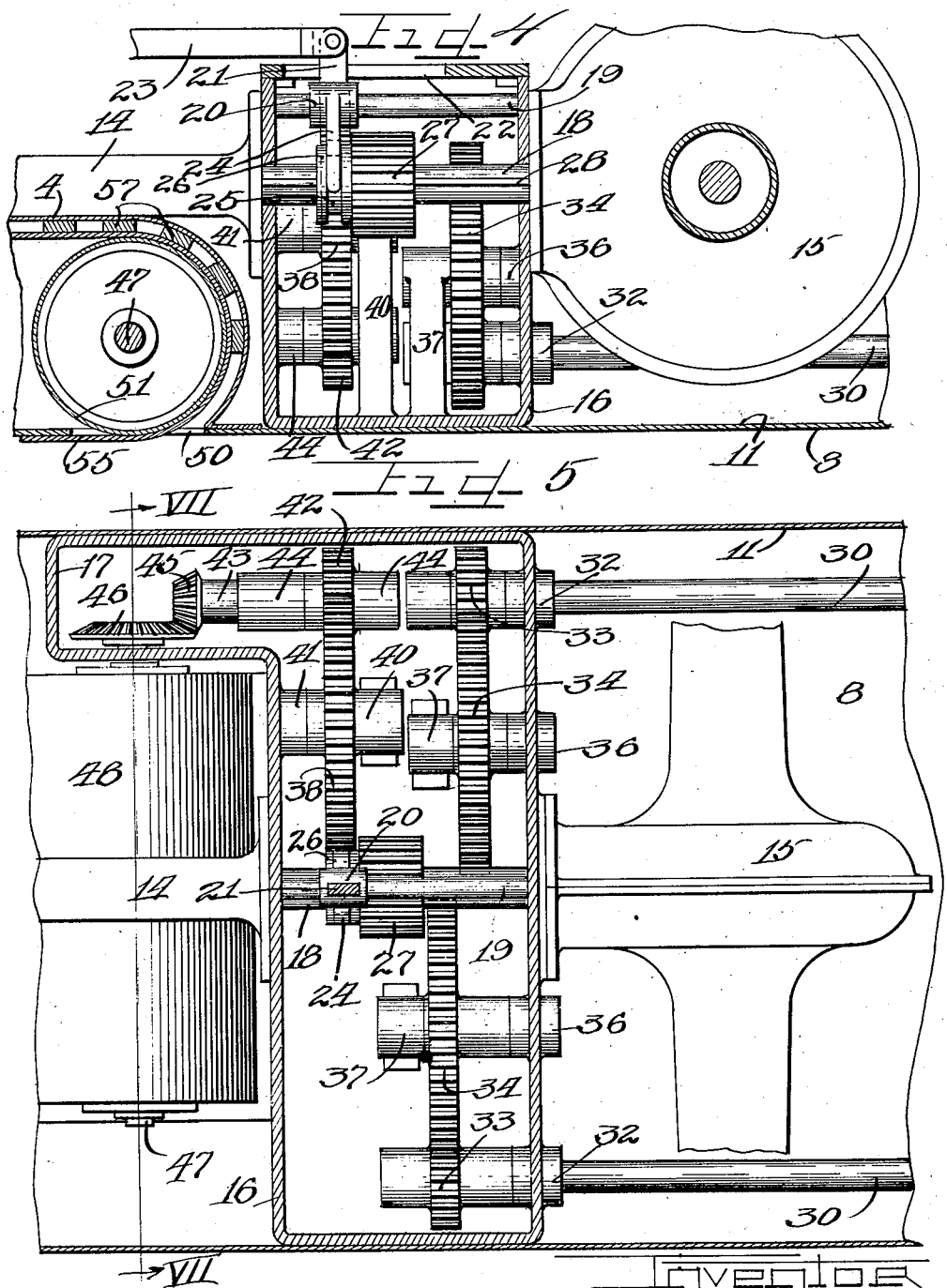

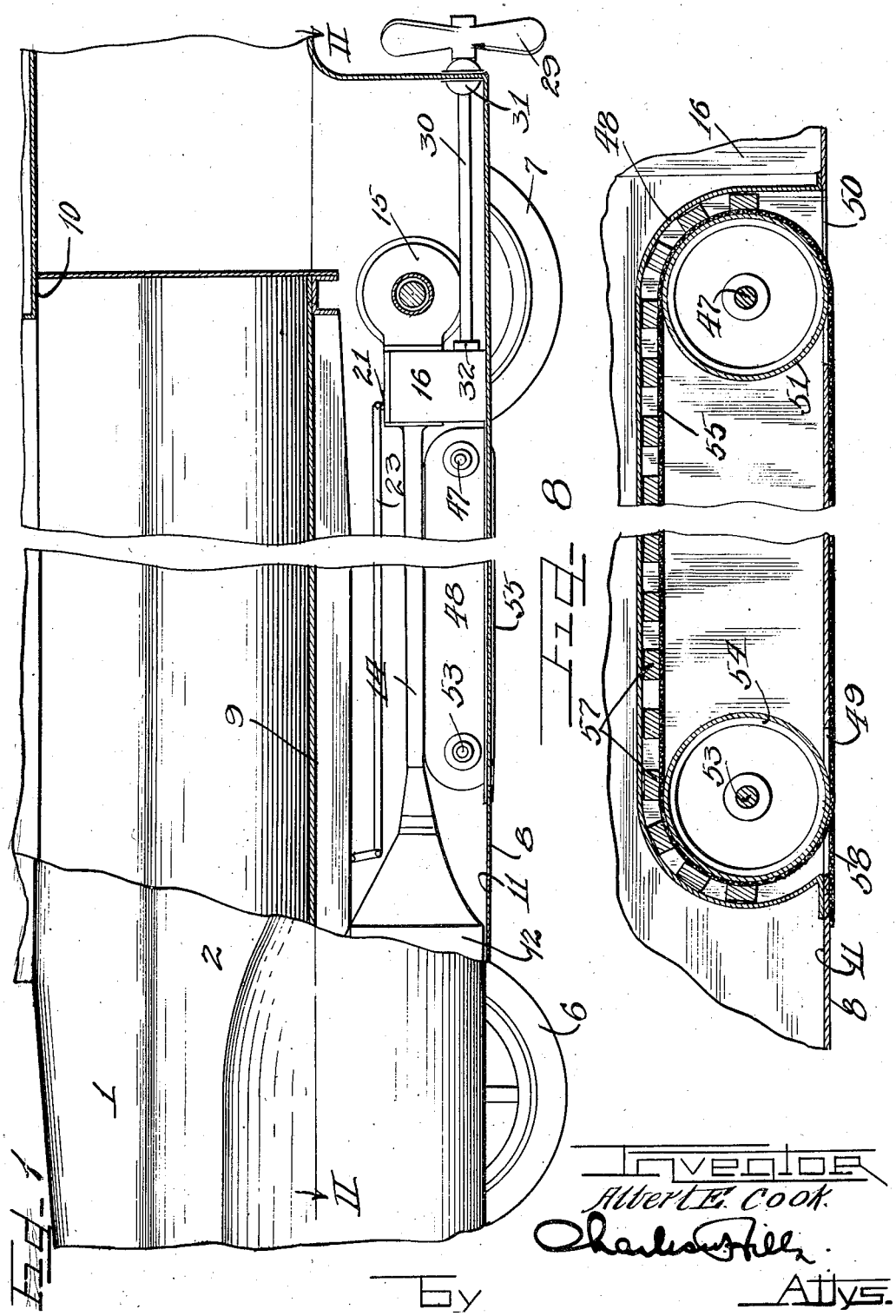

Oct. 9, 1928.
A. E. COOK
1,686,517
AUTO MARINE VEHICLE
Filed Jan. 22, 1927 6 Sheets-Sheet 4
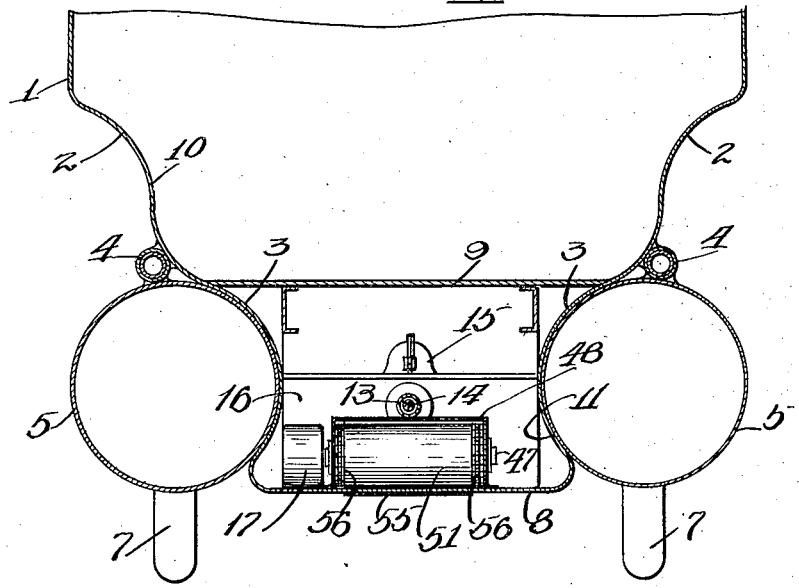
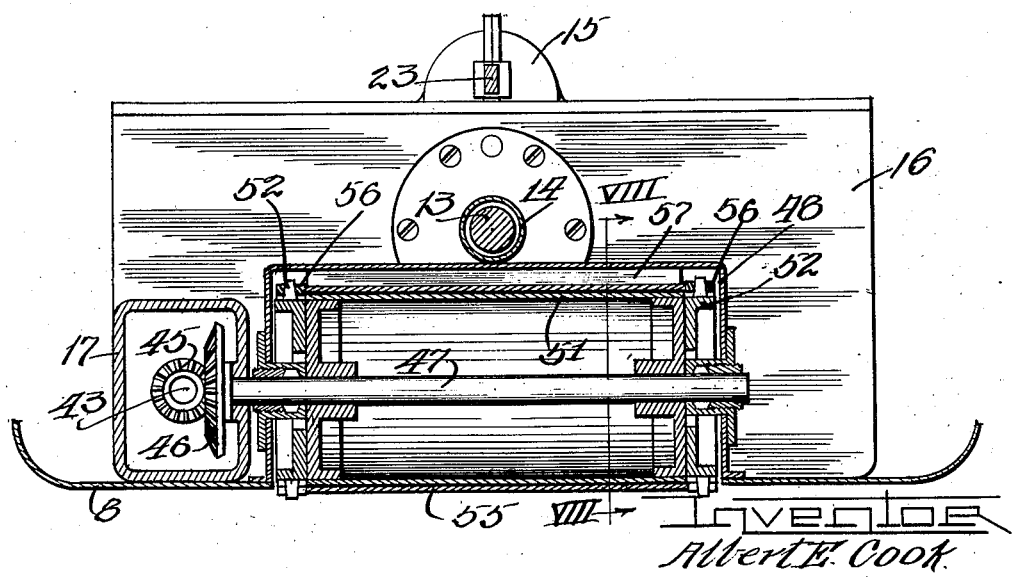

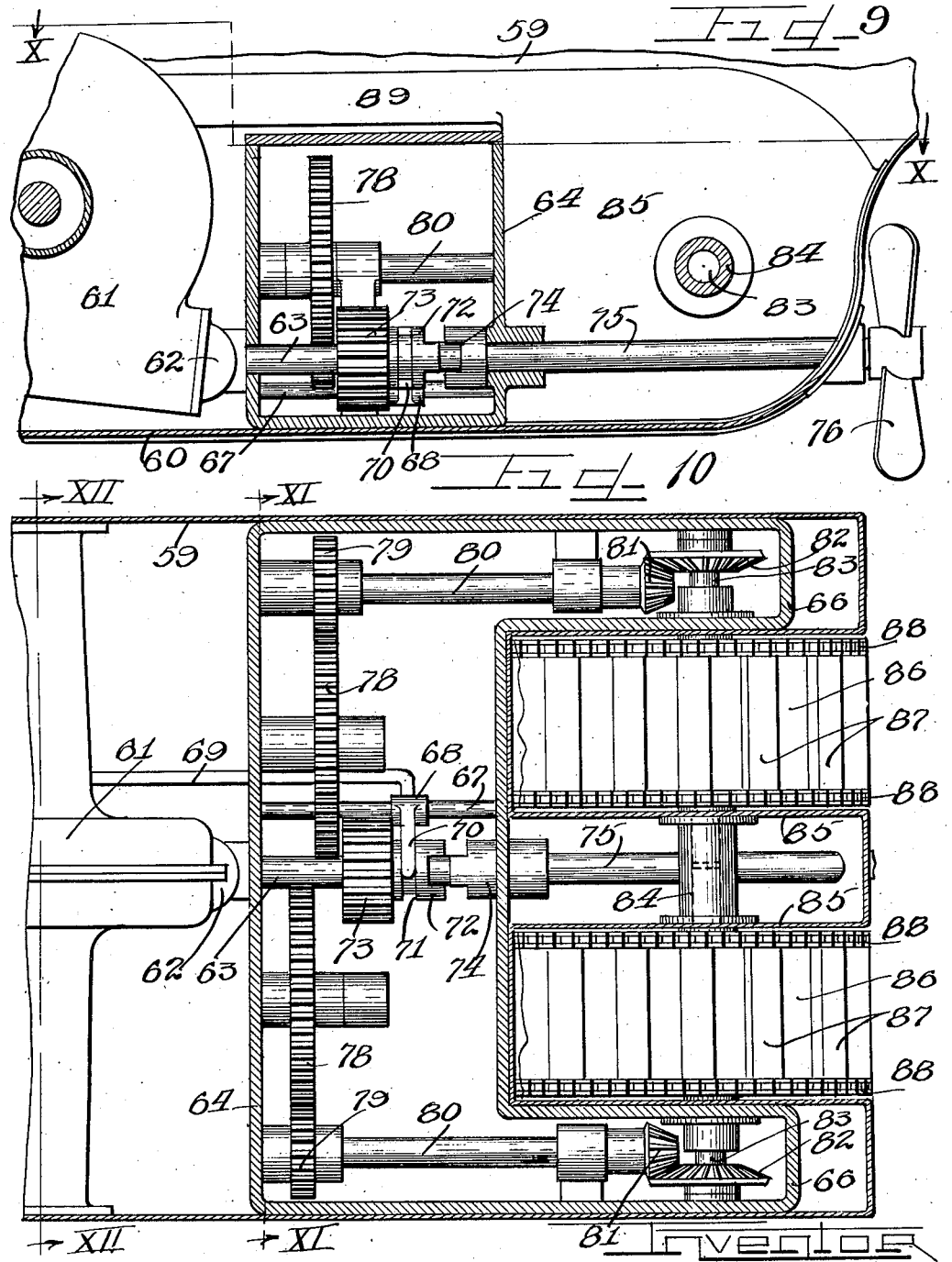

Oct. 9, 1928.

A. E. COOK 1,686,517

AUTO MARINE VEHICLE

Filed Jan. 22, 1927     6 Sheets-Sheet 6

Inventor
Albert E. Cook
By Charles Hills
Attys.

Patented Oct. 9, 1928.

1,686,517

UNITED STATES PATENT OFFICE.

ALBERT E. COOK, OF EVANSTON, ILLINOIS.

AUTO MARINE VEHICLE.

Application filed January 22, 1927. Serial No. 162,758.

This invention relates to an auto marine vehicle and more particularly to a land and water craft having an improved power unit for transmitting a drive to propellers when the device is used as a water craft, to driving wheels when the device is used as a land vehicle, or to a caterpillar traction attachment to facilitate movement of the device from a body of water up onto the land over ground which is saturated to such a point that traction between the ground and the driving wheels is impossible.

It is an object of this invention to provide an auto marine vehicle with an automobile power plant, transmission shaft and differential, said power unit being arranged with a special transmission unit adapted to be positioned between the differential and the transmission shaft of the main power unit.

It is also an object of this invention to provide an auto marine vehicle with an endless belt traction unit adapted to be connected with the power unit of the device when it is desired.

It is a further object of this invention to provide an auto marine vehicle with mechanisms for driving the same in the water or on land and with an endless belt traction arrangement adaptable for use in cases where the wheels sink into wet ground positioning the bottom of the vehicle against the ground, so that the vehicle may be moved over the ground by placing the caterpillar traction device in operation.

It is furthermore an object of this invention to provide an auto marine vehicle with three different sets of driving mechanisms selectively operable from a single power unit installed within the vehicle and adapted to be connected by a control clutch mechanism with the various traction mechanisms.

It is an important object of this invention to provide a land and water craft not only with means for driving the craft in water or on the land, but with an additional traction mechanism adapted to be brought into operation when it becomes impossible to drive the vehicle by either of the mechanisms used for driving the vehicle in water or on land.

Other and further important objects of this invention will be apparent from the disclosures in the specification and the accompanying drawings.

This invention in a preferred form is illustrated in the drawings and hereinafter more fully described.

On the drawings:

Figure 1 is a fragmentary side elevation of an auto marine vehicle embodying the principles of this invention, showing parts broken away and in section to illustrate the improved features of this invention.

Figure 2 is a longitudinal horizontal section of the stern end of the auto marine vehicle taken on line II—II of Figure 1.

Figure 3 is an enlarged transverse vertical section taken on line III—III of Figure 2, illustrating the gear mechanisms comprising the transmission unit of the device.

Figure 4 is a fragmentary sectional view taken on line IV—IV of Figure 3.

Figure 5 is a fragmentary detail plan view with parts in section taken on line V—V of Figure 3.

Figure 6 is an enlarged transverse vertical section of the vehicle taken on line VI—VI of Figure 2.

Figure 7 is a detail sectional view taken on line VII—VII of Figure 5 with parts shown in elevation.

Figure 8 is a fragmentary detail section of the caterpillar traction device taken on line VIII—VIII of Figure 7.

Figure 9 is a fragmentary longitudinal section of the stern end of a modified form of auto marine vehicle, having parts shown in section to illustrate the improved driving unit.

Figure 10 is a fragmentary longitudinal horizontal section taken on line X—X of Figure 9.

As shown on the drawings:

Figure 11:
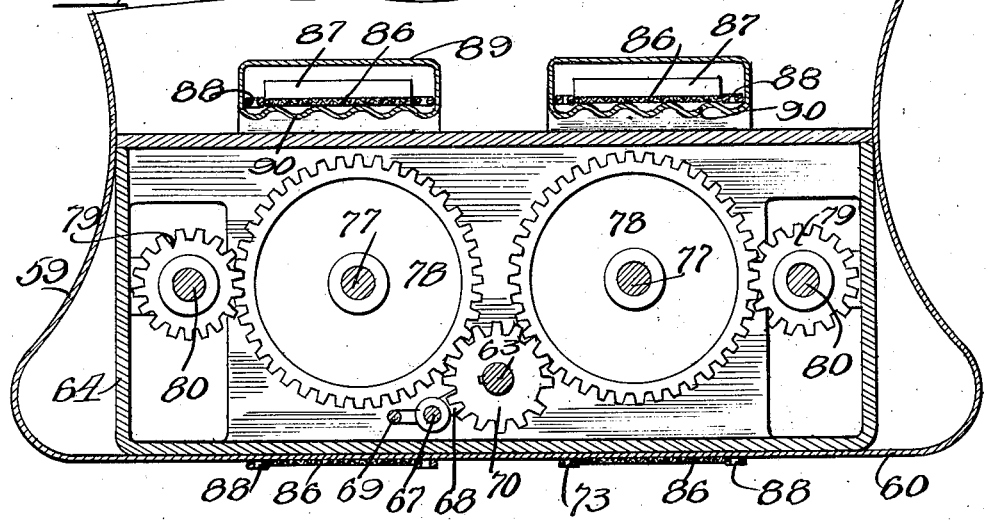
Figure 11 is a transverse sectional view taken on line XI—XI of Figure 10.

The reference numeral 1 indicates the hull or body of an auto marine vehicle, said hull being constructed to afford longitudinal upper pockets or groooves 2 and lower pockets or grooves 3. Adjustably connected to the sides of the hull 1 by hinges 4 or other suitable mechanisms are side pontoons 5 of any desired construction adapted to be secured in position in either the lower pontoon pockets 3 as illustrated in Figure 6 or in the upper pontoon pockets 2 when the vehicle is being used as a water craft. The vehicle is provided with front steering wheels 6 and with rear driving wheels 7. The rear driving wheels are adapted to be carried by the pontoons 5 and are provided with suitable driving mechanisms similar to the arrangement shown in my Patent No. 1,495,726, dated May 27, 1924, or by any other suitable connecting mechanisms. The lower portion of the hull 1 is closed by a bottom or flooring 8. The interior of the hull is divided by a flooring 9 which divides the hull into an upper chamber 10 and a lower chamber 11.

The improved auto marine vehicle is equipped with a power unit consisting of a standard automobile driving mechanism of any desired make consisting principally of an engine 12, a transmission shaft 13 enclosed within a transmission shaft housing 14, and a differential unit 15. The above mentioned automobile power unit is however modified when installed by separating the differential unit 15 from the rear end of the transmission shaft housing 14, and then inserting a control driving mechanism between the transmission shaft housing 14 and the front end of the differential unit 15. The transmission unit is contained within a housing or casing 16 having a forwardly directed extension housing 17 formed on the front side of one end thereof. The transmission unit is provided with a transmission shaft extension 18 which passes through the transmission unit housing 16 and connects the trasmission shaft 13 with the differential. Mounted transversely within the housing 16 above the transmission shaft connection 18 is a guide rod 19 on which a sleeve 20 is slidably mounted. Integrally formed on the sleeve 20 is an upwardly directed arm 21 which projects through a slot 22 in the cover plate of the housing 16. Pivoted to the upper projecting end of the arm 21 is the rear end of an actuating bar or connecting rod 23 which extends forwardly within the vehicle and has the front end connected with an operating lever or other suitable means whereby the sleeve 20 may be slidably operated upon the rod 19. Also integrally formed on the slidable sleeve 20 is a forked or yoke member 24 directed downwardly with the tines or fingers of the fork freely engaged within a groove 25 of a shiftable clutch mechanism 26. The clutch member 26 is slidably engaged on the transmission shaft extension 18 and has rigidly secured to one side thereof a control pinion 27. The clutch 26 and control pinion 27 are both slidably mounted on the shaft extension 18 and are adapted to rotate therewith by providing the shaft extension with a longitudinal key 28 so that a drive from the shaft extension 18 is imparted at all times to the control pinion 27 which may be shifted longitudinally of the shaft extension 18 by operating the control connecting bar 23.

For propelling the vehicle in water, twin screw propellers are used consisting of a pair of propeller wheels 29 which are mounted on the outer projecting ends of propeller shafts 30 mounted in parallel relation within the lower chamber 11 of the vehicle hull. The propeller shafts 30 are mounted in suitable bearings 31 and 32 and project into the auxiliary housing 16. Mounted on the inner ends of the propeller shafts 30 within the housing 16 are pinions 33 which are in mesh with large gears 34 supported on stub shafts 35 journalled in suitable bearings 36 and 37 provided within the housing 16. The large gears 34 are positioned in different vertical planes as shown in Figure 5 and are spaced apart on opposite sides of the transmission shaft extension 18 in proper relation to permit the control pinion 27 when properly shifted to be moved into intermeshing relation with either one or both of the propeller gears 34 so that a drive from the engine 12 may be transmitted to one or both of the propeller wheels 29 as occasion may demand.

Also mounted within the auxiliary housing 16 is an endless belt traction driving mechanism adapted to receive a drive from the shiftable control pinion 27. The endless belt traction driving mechanism comprises a large gear 38 mounted within the housing 16 upon a stub shaft 39 journalled in suitable bearings 40 and 41. The large gear 38 is so positioned that when the control pinion 27 is shifted forwardly within the housing 16 it is adapted to be moved into intermeshing driving relation with said gear 38 to transmit a drive thereto. Meshing with the large gear 38 is a pinion 42 mounted on a stub shaft 43 supported in bearing brackets 44 within the housing 16.

The stub shaft 43 projects into the housing extension 17 and has a bevelled pinion 45 mounted on the end thereof. The bevelled pinion 45 is in mesh with a bevel gear 46 mounted on one end of an endless belt traction driving shaft 47. The endless belt traction unit with which the auto marine vehicle is equipped comprises a casing or housing 48 which is positioned longitudinally within the lower hull chamber 11 below the transmission housing 14 as illustrated in Figures 1 and 2. The housing 48 is supported upon the bottom floor 8 above transverse openings 49 and 50 provided in the floor 8 as illustrated in Figure 8. Journalled in suitable bearings transversely of the rear end of the housing 48 is the tread driving shaft 47. Mounted on the shaft 47 within the housing 48 is a driving cylinder 51 on the ends of which driving sprocket wheels 52 are rigidly mounted. Mounted transversely within the front end of the housing 48 is a transverse shaft 53 also having a cylinder 54 mounted thereon. Mounted on the ends of the cylinder 54 are sprocket wheels 52 similar to the construction illustrated in Figure 7. Passing around the two cylinders 51 and 54 is a continuous belt 55 having the lower lap thereof projecting downwardly through the opening 49 and passing beneath the floor section 8 and finally passing up through the floor opening 50 back into the housing 48 (Figure 8). Connected to the side margins of the continuous belt 55 are continuous chains 56 which are trained over the respective sprockets 52 of the cylinders 51 and 54 so that a drive to the shaft 47 will rotate the cylinder 51 and thereby transmit the drive to the cylinder 54 so that the continuous belt 55 and the chains 56 will be driven without any slipping of the belt over the traction pulleys. Mounted transversely of the continuous belt 55 for approximately half or two thirds of its length are a plurality of parallel equi-distantly spaced tread bars or cleats 57, thereby leaving a portion of the belt free and smooth to be positioned over a portion of the bottom of the boat to protect said bottom portion when the vehicle is used on land or is propelled in shallow water by means of the propellers and wheels only. The continuous belt 55 may be constructed of rubber or cotton, or a combination of materials such as used in general practice. Mounted on the bottom of the floor 8 below the front end of the housing 48 is a closure flap 58 (Figure 8) adapted normally to close the front part of the opening 49 between the front end of the housing 48 and the front end of the continuous belt 55.

Figure 12:
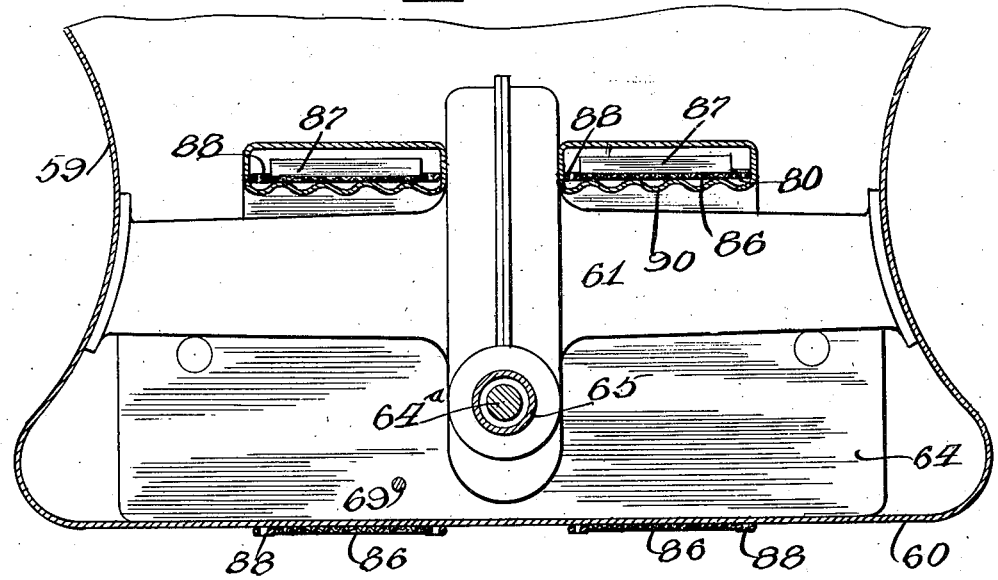
Figure 12 is a transverse vertical detail section taken on line XII—XII of Figure 10.

Referring now to Figures 9 to 12 inclusive which illustrate a modified form of the device, the reference numeral 59 indicates an auto marine vehicle hull having a bottom or floor 60. The hull 59 has a standard automobile differential 61 mounted transversely within the rear portion of the vehicle in an inverted position, to permit a drive to the differential to be transmitted through a universal connection 62 to a transmission shaft extension 63 mounted within an auxiliary housing 64 positioned within the rear portion of the hull. The transmission shaft extension 63 is coupled in driving relation to the rear end of the transmission shaft 64ª (Figure 12) which is mounted within a transmission shaft housing 65 which leads to the engine positioned in the front portion of the vehicle as illustrated in connection with the auto marine vehicle described in connection with Figures 1 to 8 of the drawings.

The auxiliary housing 64 is provided with two rearwardly directed extensions 66. Mounted transversely within the lower central portion of the auxiliary housing 64 is a guide rod 67 having a sleeve 68 slidably mounted thereon to which an operating rod 69 is connected. The operating rod 69 projects forwardly within the vehicle to a position where it may be conveniently shifted by the operator of the vehicle. Formed on the shiftable sleeve 68 is a yoke or fork member 70, the tines or fingers of which freely engage within a peripheral groove 71 of a clutch 72. The clutch 72 has rigidly secured to one end thereof a control driving pinion 73 which, together with the clutch 72 is slidably keyed on the shaft extension 63.

When the clutch member 72 is shifted rearwardly from the position illustrated in Figure 10, it connects up with a clutch collar 74 mounted on the inner end of a propeller shaft 75 which projects into the housing 64. The propeller shaft is mounted in the lower stern portion of the hull and projects outwardly therefrom to permit a propeller wheel 76 to be mounted thereon, thereby providing a mechanism for driving the auto marine vehicle when in the water.

The modified form of auto marine vehicle is also provided with a treaded traction mechanism of twin construction, the units of which are to be driven independently or together by the control pinion 73. Mounted within the auxiliary housing 64 upon stub shafts 77 are two large gears 78 positioned in different vertical planes on opposite sides of the transmission shaft extension 63 in such a position that the control pinion 73 may when shifted forwardly be moved into intermeshing relation with either or both of the large gears 78. Meshing with the large gear 78 are pinions 79. The pinions 79 are mounted on a pair of parallel shafts 80 journalled in suitable bearings within the housing 64 and projecting into the housing extension 66. Mounted on the rear ends of the auxiliary shaft 80 are bevel pinions 81 which mesh with bevel gears 82 also disposed within the housing extension 66 (Figure 10). The bevel gears 82 are mounted on the outer ends of a pair of aligned auxiliary driving shafts 83 which project out of the housing extensions 64 inwardly toward one another with the adjacent ends of said shafts 83 spaced apart within a suitable bearing sleeve 84 mounted in the lower rear portion of the hull above the propeller shaft 75. The bearing sleeve 84 is mounted between a pair of parallel casings or housings 85 formed within the rear portion of the hull 59 between the auxiliary housing extensions 66 as clearly illustrated in Figure 10. The auxiliary driving shafts 83 project through the respective casings 85 and have cylinders and sprocket wheels mounted thereon similar to the construction illustrated and described in connection with Figure 7 of the drawings. Mounted within each of the casings 85 around the driving drum is a continuous belt 86 having a plurality of tractor tread bars 87 secured transversely thereof in spaced parallel relation around substantially half of the peripheral surface of the continuous belt. Continuous chains 88 are secured to the side margins of the respective continuous belts 86 and coact with sprocket wheels formed on the ends of the cylinders on which the continuous belts 86 are engaged. Connected to each of the auxiliary casings 85 is a forwardly directed chute or tube 89, the lower wall 90 of which is corrugated, to permit mud and dirt to be flushed out of said tube when necessary. The tubes 89 project forwardly within the hull and then downwardly to connect with openings in the floor or bottom 60 of the hull thereby permitting the continuous belt traction devices to leave the interior of the hull and run rearwardly beneath the bottom 60 to again enter the auxiliary housings 85 in the rear of the hull. The front ends of the tubes 89 may be enlarged to afford auxiliary casings similar to the casings 85 within which driving drums and sprocket wheels may be mounted similar to the construction illustrated in Figure 7 of the drawings. By referring to Figure 10 it will be noted that the control pinion 73 may be shifted into driving relation with either one or both of the large gears 78 thereby permitting either one or both of the endless belt tractor units to be operated when desired. The clutch 72 may also be shifted rearwardly to permit the drive from the power unit to be transmitted to the propeller wheel 76.

The operation is as follows:

In the embodiment of this invention as illustrated and described in connection with Figures 1 to 8 inclusive of the drawings the drive from the engine 12 may be transmitted to the rear driving wheels 7 of the auto marine vehicle through the differential 15 so that the vehicle may be properly driven when on the land. When the vehicle is used as a water craft, the operator operates the connecting bar 23 to cause the sleeve 20 to be shifted rearwardly thereby causing the control pinion 27 to be shifted into meshing engagement with either one or both of the large gears 34, thereby causing a drive from the engine 12 to be transmitted to the twin propeller shafts 30 and then to the propeller wheels 29 to cause the auto marine craft to be driven through the water.

When it is desired to run the auto marine vehicle from the water onto the land over a muddy shore in which the rear wheels 7 are liable to sink so that they can not have proper traction, the operator again actuates the connecting bar 23 in a direction to cause the control pinion 27 to be shifted forwardly on the transmission shaft extension 18 into meshing relation with the large gear 38 thereby causing the drive from the engine 12 to be transmitted to the gear 38 and the pinion 42 then through the meshing bevel gears 45 and 46 to the endless belt traction drive shaft 47. A drive is thus transmitted to the traction mechanism causing the continuous belt 55 to be rotated so that the tread bars 57 which normally are positioned within the upper portion of the housing or casing 48 to move outwardly through the opening 49 (Figure 8) causing the flap 53 to open as the tread bars 57 leave the bottom of the hull and engage in the soft ground to cause the auto marine vehicle to be advanced upwardly out of the water over the shore and onto dry land with which proper traction may be had by the rear wheels 7. It will thus be seen that the improved auto marine vehicle is provided with three different driving or propelling mechanisms, namely, the rear driving wheel 7, the twin propellers 29, and the tractor unit. These various driving mechanisms may be selectively brought into operation by the operator of the vehicle as desired. The tractor unit of course is also adaptable for use on the land in case the vehicle is used on very muddy roads or becomes ditched to such a degree that the rear wheels 7 can not extricate the vehicle. In such a case the control pinion 27 may be shifted to connect up the treaded belt unit which when operated will readily act to pull the vehicle through the muddy road or out of the ditch as the case may be.

The operation of the modified form of auto marine vehicle illustrated in Figures 9 to 12 inclusive of the drawings is similar to that described in connection with Figures 1 to 8 inclusive with the exception that twin treaded belt mechanisms are provided which extend from the stern end of the vehicle forwardly on opposite sides thereof a distance depending upon the design of the vehicle. In this case, when the vehicle becomes stuck either on a soft shore, a muddy road, or in a ditch, either one or both of the treaded units may be brought into operation by the driver by shifting the control pinion 73, into engagement with either one of the large gears 78 or if desired into engagement with both of said gears when it becomes necessary to use both of the treaded units.

Attention is called to the fact that in both forms of the improved auto marine vehicle described, a standard automobile driving engine, transmission shaft and differential may be used in conjunction with an improved power transmission unit which is clutch controlled and so constructed that the same may be operated to cause a drive to be transmitted from the engine to the rear driving wheels of the vehicle, to the propeller mechanisms or to the traction units as desired.

While two forms of treaded endless belt units have been described and illustrated for use in connection with an auto marine vehicle, it will of course be understood that treaded endless belt traction units of any desired type may be used in connection with auto marine vehicles constructed different than the types herein illustrated and described without departing from my invention.

I am aware that many changes may be made, and numerous details of the construction varied through a wide range, without departing from the principles of this invention, and I therefore do not purpose limiting the patent granted hereon, otherwise than necessitated by the prior art.

I claim as my invention:

1. An auto marine vehicle comprising a body, driving wheels and steering wheels thereon, a power plant in the said body, a propeller mechanism for operating the vehicle in the water, an endless belt disposed within a housing in the body so that the bottom of the vehicle normally presents a smooth surface, tread members secured on a portion of the belt operable to project below the bottom of the body to secure traction for the vehicle when the said bottom is contiguous to unstable supporting material, and means to selectively drive the said endless belt.

2. An auto marine vehicle comprising a body, driven wheel means to propel the body on land, a propeller mechanism for operating the vehicle in water, an endless belt disposed within a housing in the body so that the bottom of the vehicle normally presents a smooth surface when the vehicle is normally operative on land and on the water, treads on a portion of the said belt operable and adapted to secure traction for the vehicle when its bottom is contiguous to unstable supporting material, pulleys supporting the belt and within the aforesaid housing, chains secured to the belt, sprockets on the said pulleys engaging the said chains and means to selectively drive the said pulleys.

3. In combination with an auto marine vehicle body, mutilated endless belt tractors disposed within housings in the body so that the bottom of the vehicle normally presents a substantially smooth surface when the vehicle is normally operative on land and on the water, and adapted to afford traction to the vehicle when its bottom is contiguous to unstable supporting material, and means to selectively drive the said endless belts.

In testimony whereof I have hereunto subscribed my name.

ALBERT E. COOK.